(12) United States Patent
Baer et al.

(10) Patent No.: US 6,832,887 B2
(45) Date of Patent: Dec. 21, 2004

(54) BULK MATERIAL PUMP FEEDER

(75) Inventors: Timothy R. Baer, Gibbsboro, NJ (US);
James T. Foley, Mickelton, NJ (US)

(73) Assignee: K-Tron Technologies, Inc.,
Wilmington, DE (US)

( * ) Notice: Subject to any disclaimer, the term of this patent is extended or adjusted under 35 U.S.C. 154(b) by 274 days.

(21) Appl. No.: 10/119,359

(22) Filed: Apr. 9, 2002

(65) Prior Publication Data

US 2003/0190198 A1 Oct. 9, 2003

(51) Int. Cl.[7] .................................................. F01D 1/36
(52) U.S. Cl. ............................ 415/90; 406/81; 406/99;
415/204; 415/206; 198/642
(58) Field of Search ............................ 198/642; 406/71,
406/99; 415/90, 204, 206, 224.5

(56) References Cited

U.S. PATENT DOCUMENTS

| 1,061,142 | A |   | 5/1913  | Tesla |
|-----------|---|---|---------|-------|
| 2,632,399 | A | * | 3/1953  | Hyre .......................... 418/137 |
| 2,868,351 | A | * | 1/1959  | William ...................... 198/564 |
| 3,245,613 | A | * | 4/1966  | Jonakin ........................ 494/35 |
| 3,787,093 | A | * | 1/1974  | Hanselmann et al. ......... 406/71 |
| 3,920,116 | A |   | 11/1975 | Butler |
| 4,516,674 | A |   | 5/1985  | Firth |
| 4,826,401 | A | * | 5/1989  | Clark et al. ................. 415/200 |
| 4,988,239 | A |   | 1/1991  | Firth |
| 5,051,041 | A |   | 9/1991  | Firth |
| 5,186,604 | A | * | 2/1993  | Iorio et al. .................... 415/90 |
| 5,190,140 | A |   | 3/1993  | Buschbom |
| 5,355,993 | A |   | 10/1994 | Hay |
| 5,356,280 | A |   | 10/1994 | Ponzielli |
| 5,402,876 | A |   | 4/1995  | Hay |
| 5,485,909 | A |   | 1/1996  | Hay |
| 5,497,873 | A |   | 3/1996  | Hay |
| 5,533,650 | A |   | 7/1996  | Conrad et al. |
| 5,551,553 | A |   | 9/1996  | Hay |
| 6,135,730 | A |   | 10/2000 | Yoshioka |
| 6,213,289 | B1 | * | 4/2001 | Hay et al. .................... 198/642 |
| 6,375,412 | B1 | * | 4/2002 | Dial ............................. 415/90 |
| 6,431,831 | B1 | * | 8/2002 | Addie et al. ................ 415/206 |
| 6,575,695 | B1 | * | 6/2003 | Miyamoto ................... 415/119 |

FOREIGN PATENT DOCUMENTS

| EP | 0 544 621 A1 | 6/1993 |
| WO | WO 96/24810 | 8/1996 |

OTHER PUBLICATIONS

International Search Report.

* cited by examiner

Primary Examiner—Joe Dillon, Jr.
(74) Attorney, Agent, or Firm—RatnerPrestia

(57) ABSTRACT

A bulk materials pump feeder having a housing and a rotatable drive rotor mounted in the housing for transferring material introduced into the housing through an inlet to an outlet for discharge of the material from the housing. The drive rotor has a hub and a plurality of drive discs extending away from the hub toward an inner wall of the housing. To reduce the tendency of material passing through the housing to wedge between the inner wall of the housing and the circumferential edges of the drive discs, the distance between the circumferential edges of the drive discs and the inner wall of the housing increases from the inlet of the housing to the outlet of the housing in the direction of rotation of the drive rotor.

21 Claims, 4 Drawing Sheets

BULK MATERIAL PUMP FEEDER

TECHNICAL FIELD

The present invention relates, in general, to materials handling equipment and, in particular, to a pump feeder of materials handling equipment that feeds bulk materials.

BACKGROUND OF THE INVENTION

In certain bulk materials handling equipment, such as the equipment described and illustrated in U.S. Pat. Nos. 5,051,041 and 5,355,993, a pump feeder moves bulk material through a housing from an inlet to an outlet by a rotating drive rotor having two or more drive discs mounted to or integral with a rotating hub. In the past, this type of equipment has been used for feeding coal and other breakable material having uniform and non-uniform gradation. Typically, the drive systems for this equipment have delivered large torque at slow speed.

As such equipment is adapted to handle different materials supplied in different sizes, problems that have not been encountered previously are arising. One such problem of major importance is the tendency of smaller size equipment, handling harder, smaller size material such as plastic, to stall, sometimes only temporarily, as the material being handled wedges between the rotating drive rotor and the housing or stationary parts mounted to the housing. This wedging of material can occur, for example, between the drive discs of the drive rotor and the housing inner wall or between the hub of the drive rotor and a materials scraper mounted to the inner wall of the housing.

Simply increasing the drive power (i.e., providing a larger drive motor) to overcome the wedging is not, in most instances, an adequate or satisfactory solution to the problem. Cost and space limitations are but two restrictions on simply providing increased drive power. Certain of the materials being handled are not easily breakable, so a larger drive motor simply increases the effect of the material wedging between the rotating drive rotor and the housing or stationary parts mounted to the housing. This can result in a complete stoppage of operation and damage to the equipment. With breakable materials, such coal, the drive torque is large enough to break or pulverize the material into smaller pieces that do not wedge between the rotating drive rotor and the housing or stationary parts mounted to the housing.

Although this adverse wedging effect might not be a regular occurrence and is likely to be different for handling different types of material, when it does occur, even temporarily, it affects accuracy and feeder performance to an unacceptable extent. Because the tendency of the equipment to stall, either temporarily or for longer periods of time, due to this wedging is greater at higher speed operation of the equipment, slowing down the operation of the equipment to reduce the likelihood of material wedging, while possibly reducing the likelihood of wedging, also is unacceptable.

SUMMARY OF THE INVENTION

A bulk materials pump feeder, constructed in accordance with the present invention, includes a housing having an inlet, an outlet, and an inner wall extending from the inlet of the housing to the outlet of the housing. This bulk materials pump feeder also includes a drive rotor having a hub rotatable about a rotation axis and a plurality of drive discs extending away from the hub toward the inner wall of the housing. The distance between the circumferential edges of the drive discs and the inner wall of the housing increases from the inlet of the housing to the outlet of the housing in the direction of rotation of the drive rotor. The inner wall of the housing, the drive discs, and the hub define a materials transfer duct through which material is transferred from the inlet of the housing to the outlet of the housing.

BRIEF DESCRIPTION OF THE DRAWINGS

The present invention is best understood from the following detailed description when read in connection with the accompanying drawings. Included in the drawings are the following figures.

DETAILED DESCRIPTION OF THE INVENTION

Figure 1:
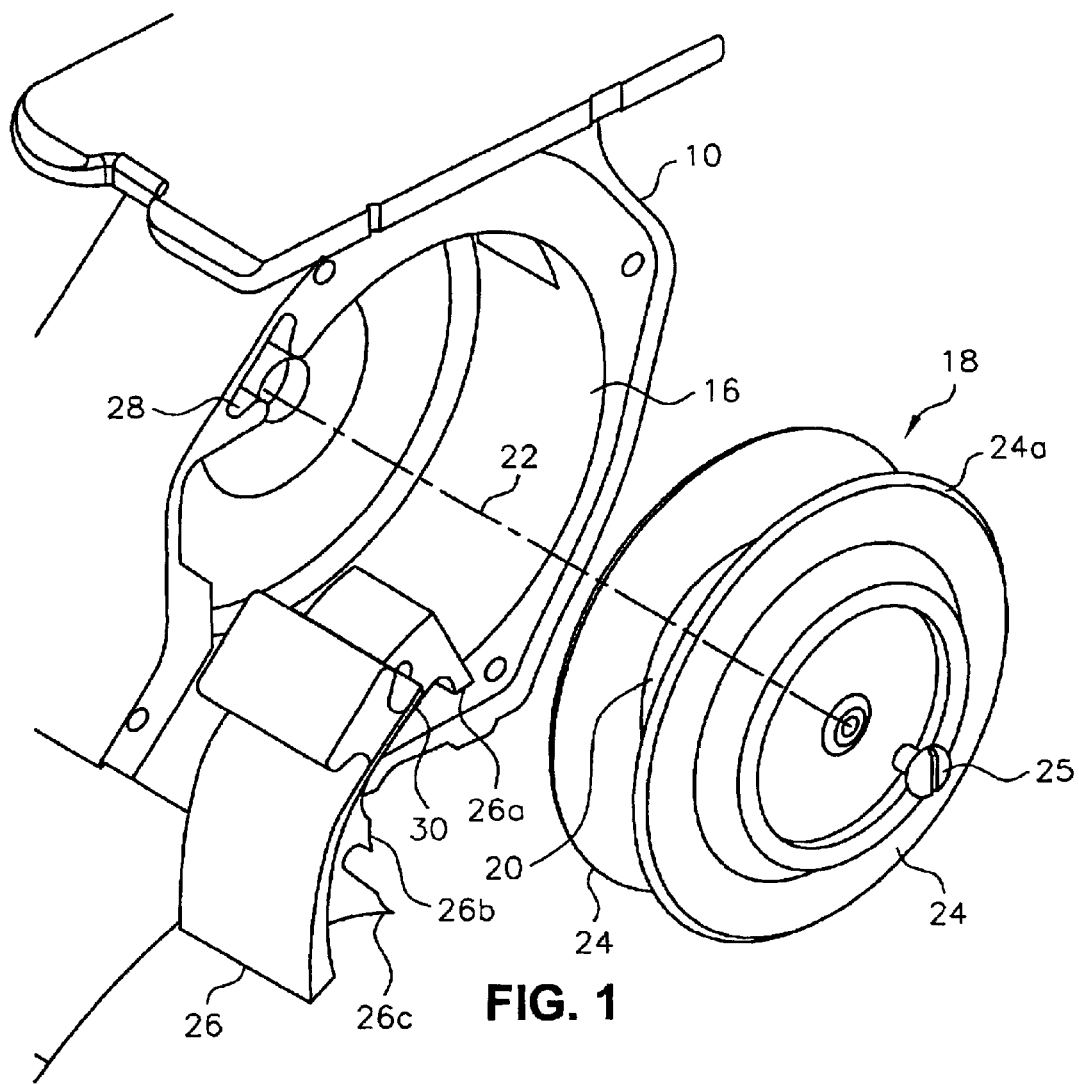
FIG. 1 is an exploded, perspective view of a bulk materials pump feeder constructed in accordance with the present invention.
Figure 2:
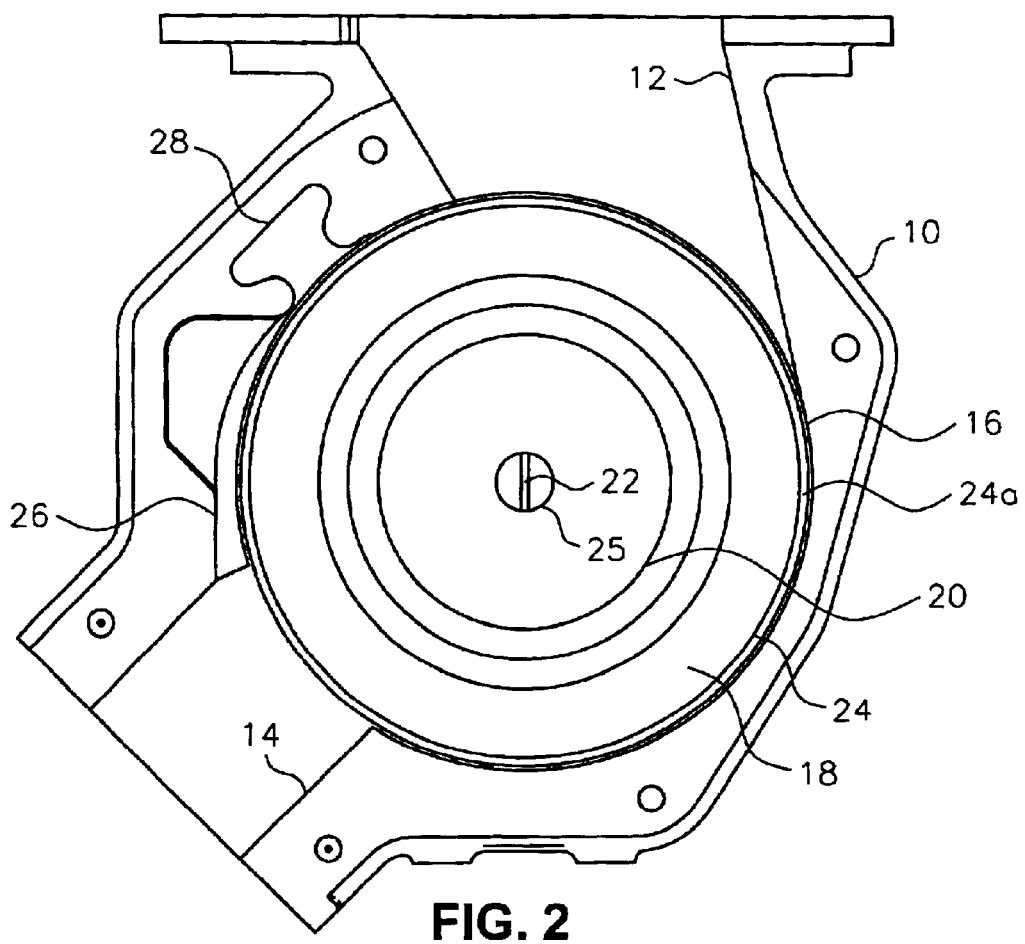
FIG. 2 is a side view of a bulk materials pump feeder constructed in accordance with the present invention.

Referring to FIGS. 1 and 2, a bulk materials pump feeder, constructed in accordance with the present invention, includes an housing 10 having an inlet 12, an outlet 14, and an inner wall 16 extending from inlet 12 to outlet 14. A bulk materials pump feeder, constructed in accordance with the present invention, is generally similar in construction and operation to the units described and illustrated in U.S. Pat. Nos. 5,051,041 and 5,355,993, the contents of which are incorporated herein by reference.

The bulk materials pump feeder of FIGS. 1 and 2 also has a drive rotor 18 having a hub 20 that is rotatable about a rotation axis 22 and a pair of drive discs 24 which extend away from the hub toward inner wall 16 of housing 10. For the embodiment of the invention being described, hub 20 and drive discs 24 are formed as a single unit. Drive discs 24 can be formed with radially extending discontinuities on the interior faces as described and illustrated in U.S. Pat. No. 5,355,993 to facilitate transfer of material from inlet 12 of housing 10 to outlet 14 of the housing. Preferably, the outside surfaces of drive discs 24 each have a bevel 24a at the circumferential edge of the drive disc for a reason to be explained below.

Drive rotor 18 is mounted in housing 10 for rotation about rotation axis 22 and is held in place by, for example, a screw 25. For the embodiment of the invention illustrated in the drawings and being described, drive rotor 18 has two drive discs 24. Drive rotor 18 can be arranged to have more than two drive discs. The number of drive discs to be included in the drive rotor is dependent on the particular application of bulk materials pump feeder (i.e., materials being transferred, performance specifications, etc.).

Figure 3:
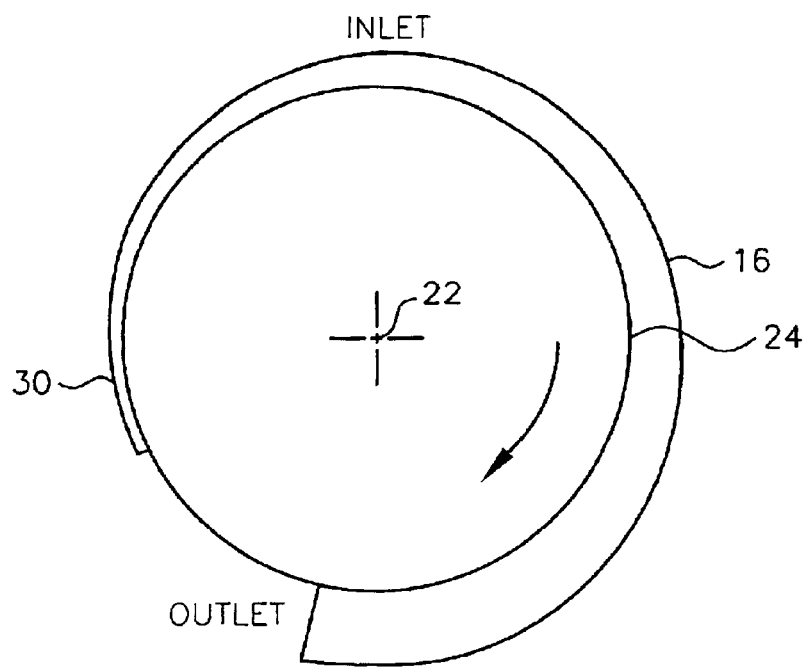
FIG. 3 is a schematic drawing of the relationship between the drive discs and the inner wall of the housing of a bulk materials pump feeder constructed in accordance with the present invention.

As shown most clearly in FIG. 3, which is a schematic drawing of the relationship between drive discs 24 and inner wall 16 of housing 10, the distance between the circumferential edges of the drive discs and the inner wall of the housing increases from the INLET of the housing to the OUTLET of the housing in the direction of rotation of the drive rotor, which is clockwise as indicated by the arrow for the embodiment of the invention illustrated in the drawings and being described. The drive discs and the inner wall of the housing can be shaped in different ways to provide the desired spacing between the two. For the embodiment of the invention illustrated in the drawings and being described, drive discs 24 are circular and extend away from hub 20 perpendicular to rotation axis 22 of the hub and inner wall 16 of housing 10 is spiral shaped. The spiral shaped inner wall 16 of housing 10 can be defined by the Archimedes spiral equation:

$$R=\theta *a$$

where:
"R" is the radius
"θ" is the polar angle
"a" is the rate of radial increase given in some unit of measure per angular unit, such as mm/degree The distance between the circumferential edges of the drive discs and the inner wall of the housing is exaggerated in FIG. 3 for purposes of illustration.

For the embodiment of the present invention represented by FIG. 3, the desired increasing distance between the circumferential edges of the drive discs and the inner wall of the housing is effected by the spiral shape of the inner wall of the housing. This desired increasing distance between the circumferential edges of the drive discs and the inner wall of the housing also can be effected by the design of the drive discs or by a combination of the design of the drive discs and the design of the inner wall of the housing.

Inner wall 16 of housing 10, the inside surfaces of drive discs 24, and hub 20 define a materials transfer duct through which material is transferred from inlet 12 of the housing to outlet 14 of the housing. As drive rotor 18 is rotated by a motor (not shown) coupled to the drive rotor by suitable means, drive discs 24 cause material, introduced into the bulk materials pump feeder through inlet 12 of housing 10, to be transferred to outlet 14 of the housing where the material is discharged from the bulk materials pump feeder. Pieces of material being transferred through this bulk materials pump feeder from the inlet to the outlet that tend to wedge between the inner wall of the housing and the circumferential edges of the drive discs move in the direction of rotation of the drive rotor to a larger spacing between the circumferential edges of the drive discs and the inner wall of the housing and do not wedge because of the increasing space between the circumferential edges of the drive discs and the inner wall of the housing. Instead, this material is discharged through outlet 14. By beveling the outside surfaces of drive discs 24 at the circumferential edges, the surface areas of the circumferential edges of the drive discs are minimized, thereby reducing the tending of material to wedge between the drive discs and the inner wall of the housing.

Figure 4:
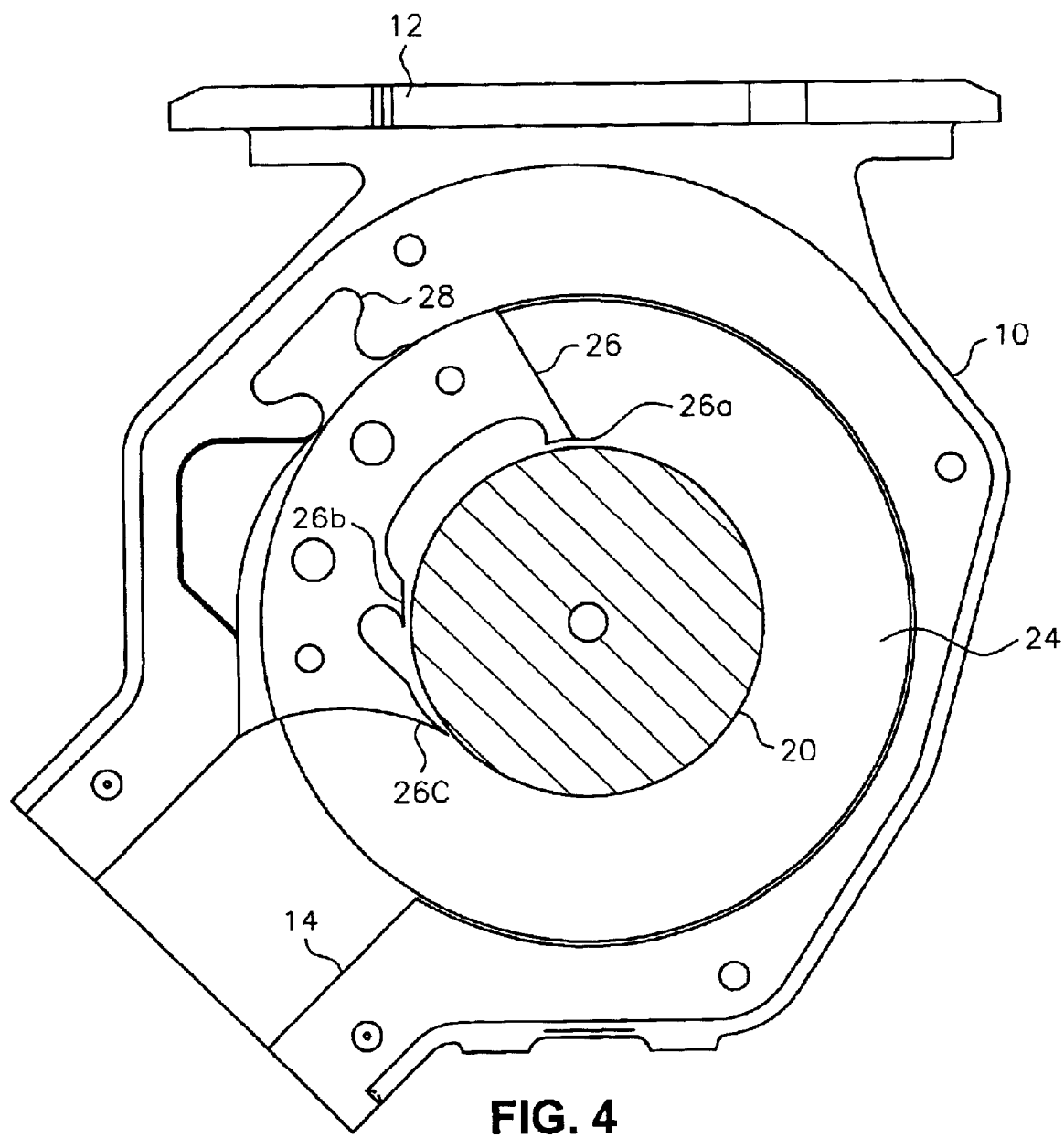
FIG. 4 is a side view showing the relationship of the FIG. 1 drive rotor hub and the FIG. 1 materials scraper.

Referring to FIGS. 1, 2, and 4, a bulk materials pump feeder, constructed in accordance with the present invention, preferably includes a materials scraper 26 that is mounted in a recess 28 in inner wall 16 of housing 10 downstream from outlet 14 and upstream from inlet 12. Materials scraper 26 extends into drive rotor 18 in the space between the interior faces of drive discs 24 almost touching hub 20.

Certain materials that are transferred through the bulk materials pump feeder will, under certain conditions, cling to drive rotor 18 and not be discharged through outlet 14. Materials scraper 26 scrapes such material from the drive rotor and, generally, this material falls back and is discharged through the outlet.

Materials scraper 26 has two surfaces 30 (only one is illustrated in FIG. 1) that face the circumferential edges of drive discs 24. The distance between surfaces 30 of the materials scraper and the circumferential edges of the drive discs increases in the direction of rotation of drive rotor 18 from the distance between inner wall 16 of housing 10 and the circumferential edges of drive discs at outlet 14 of the housing to the distance between the inner wall of the housing and the circumferential edges of the drive discs at inlet 12 of the housing. In particular, surfaces 30 of materials scraper 26 are, in effect, continuations of inner wall 16 of the housing, so that material that is not discharged at outlet 14 that tends to wedge between the materials scraper and the circumferential edges of drive discs 24 moves in the direction of rotation of the drive rotor to a larger spacing between the drive discs and the materials scraper and either falls back and is discharged through the outlet or falls in with material that is introduced at the inlet 12. The increasing space between surfaces 30 of materials scraper 26 and the circumferential edges of drive discs 24, from the OUTLET to the INLET, is illustrated in FIG. 3.

Materials scraper 26 that is illustrated in FIGS. 1 and 4 has a plurality of scraping tips 26a, 26b, and 26c that scrape material that is not discharged at outlet 14. As illustrated in FIG. 4, the spacing between materials scraper 26 and hub 20, specifically the spacing between scraping tips 26a, 26b, and 26c and the hub, increases in the direction of rotation of drive rotor 18 from outlet 14 to inlet 12 to reduce, or even eliminate, the tendency of material to wedge between the scraper and the hub. Scraping tips 26a, 26b, and 26c can be points on a spiral or simply points that are spaced from hub 20 the desired distances.

Figure 5:
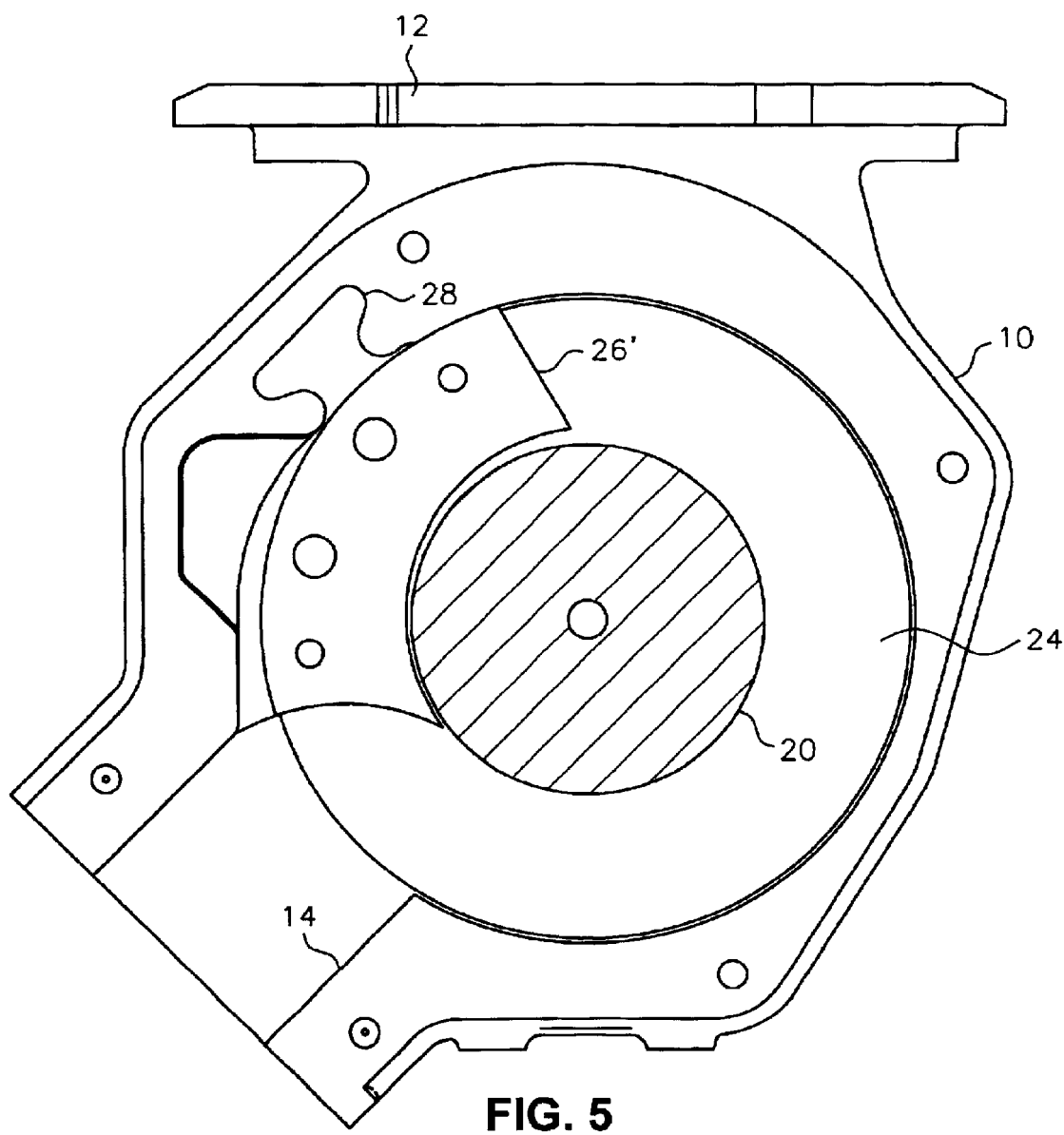
FIG. 5 is a side view showing the relationship of the FIG. 1 drive rotor hub and a second materials scraper.

A second form of materials scraper is illustrated in FIG. 5. Scraper 26' of FIG. 5 has a continuous scraping surface, rather than a plurality of scraping tips as in materials scraper 26 shown in FIG. 4. The spacing between the scraping surface of materials scraper 26' and hub 20 increases in the direction of rotation of the from outlet 14 to inlet 12 to reduce, or even eliminate, the tendency of material to wedge between the scraper and the hub. The scraping surface of materials scraper 26' can be spiral shaped.

Although illustrated and described above with reference to certain specific embodiments, the present invention nevertheless is not intended to be limited to the details shown. Rather, various modifications may be made in the details within the scope and range of equivalents of the claims and without departing from the spirit of the invention.

What is claimed:

1. A gas medium bulk materials pump feeder comprising:
   a housing having:
   (a) an inlet,
   (b) an outlet, and
   (c) a substantially rigid inner wall extending from said inlet to said outlet; and
   a drive rotor having:
   (a) a hub rotatable about a rotation axis, and
   (b) a plurality of drive discs having circumferential edges extending away from said hub toward said inner wall of said housing, with the distance between the circumferential edges of said drive discs and said inner wall of said housing continuously increasing from said inlet of said housing to said outlet of said housing in the direction of rotation of said drive rotor, thereby providing a continuously increasing space between the circumferential edges of said drive discs and said inner wall of said housing;

said inner wall of said housing, said drive discs, and said hub defining a materials transfer duct through which material is transferred from said inlet of said housing to said outlet of said housing; said pump configured and operable to pump bulk materials in a gas medium.

2. A bulk materials pump feeder according to claim 1 wherein said drive discs are mounted to said hub perpendicular to said rotation axis of said hub.

3. A bulk materials pump feeder according to claim 2 wherein:
    (a) said drive discs are circular, and
    (b) said inner wall of said housing is spiral shaped.

4. A bulk materials pump feeder according to claim 2 wherein:
    (a) said drive discs are circular, and
    (b) said inner wall of said housing is defined by an Archimedes spiral.

5. A bulk materials pump feeder according to claim 3 wherein said drive rotor has two drive discs.

6. A bulk materials pump feeder according to claim 5 wherein each of said drive discs has:
    (a) an inside surface that defines said materials transfer duct, and
    (b) an outside surface having a bevel at the circumferential edge of said drive disc.

7. A bulk materials pump feeder according to claim 1 wherein said bulk materials pump feeder further includes a materials scraper:
    (a) mounted in said housing,
    (b) extending into said drive rotor between said drive discs, and
    (c) having surfaces facing said circumferential edges of said drive discs, with the distance between said surfaces of said scraper and the circumferential edges of said drive discs increasing in the direction of rotation of said drive rotor from the distance between said inner wall of said housing and the circumferential edges of said drive discs at said outlet of said housing to the distance between said inner wall of said housing and the circumferential edges of said drive discs at said outlet of said housing.

8. A bulk materials pump feeder according to claim 7 wherein said housing further has a recess in said inner wall downstream from said outlet of said housing and upstream from said inlet of said housing relative to the direction of rotation of said drive rotor and said materials scraper is mounted in said recess.

9. A bulk materials pump feeder according to claim 8 wherein said drive discs are mounted to said hub perpendicular to said rotation axis of said hub.

10. A bulk materials pump feeder according to claim 9 wherein:
    (a) said drive discs are circular, and
    (b) said inner wall of said housing is spiral shaped.

11. A bulk materials pump feeder according to claim 10 wherein said drive rotor has two drive discs.

12. A bulk materials pump feeder according to claim 11 wherein each of said drive discs has:
    (a) an inside surface that defines said materials transfer duct, and
    (b) an outside surface having a bevel at the circumferential edge of said drive disc.

13. A bulk materials pump feeder according to claim 7 wherein said materials scraper also has a plurality of scraping tips, with the distance between said scraping tips and said hub increasing in the direction of rotation of said drive rotor from the distance between said inner wall of said housing and the circumferential edges of said drive discs at said outlet of said housing to the distance between said inner wall of said housing and the circumferential edges of said drive discs at said inlet of said housing.

14. A bulk materials pump feeder according to claim 7 wherein said materials scraper also has a continuous scraping surface, with the distance between said continuous scraping surface and said hub increasing in the direction of rotation of said drive rotor from the distance between said inner wall of said housing and the circumferential edges of said drive discs at said outlet of said housing to the distance between said inner wall of said housing and the circumferential edges of said drive discs at said inlet of said housing.

15. A bulk materials pump feeder according to claim 14 wherein said continuous scraping surface of said materials scraper is spiral shaped.

16. A gas medium bulk materials pump feeder comprising:
    a housing having:
        (a) an inlet through which materials is introduced into said housing,
        (b) an outlet through which materials is discharged from said housing, and
        (c) a substantially rigid inner wall extending from said inlet to said outlet; and
    a drive rotor mounted within said housing for rotation about a rotation axis for transferring materials introduced into said housing through said inlet of said housing to said outlet of said housing for discharge from said housing, said drive rotor having:
        (a) a hub rotatable, and
        (b) a plurality of drive discs having circumferential edges extending away from said hub toward said inner wall of said housing, with the distance between the circumferential edges of said drive discs and said inner wall of said housing continuously increasing from said inlet of said housing to said outlet of said housing in the direction of rotation of said drive rotor, thereby providing a continuously increasing space between the circumferential edges of said drive discs and said inner wall of said housing; said pump configured and operable to pump bulk materials in a gas medium.

17. A bulk materials pump feeder according to claim 16 wherein said bulk materials pump feeder further includes a materials scraper:
    (a) mounted in said inner wall of said housing,
    (b) extending into said drive rotor between said drive discs, and
    (c) having surfaces facing said circumferential edges of said drive discs, with the distance between said surfaces of said scraper and the circumferential edges of said drive discs increasing in the direction of rotation of said drive rotor from the distance between said inner wall of said housing and the circumferential edges of said drive discs at said outlet of said housing to the distance between said inner wall of said housing and the circumferential edges of said drive discs at said outlet of said housing.

18. A bulk materials pump feeder according to claim 17 wherein:
    (a) said drive discs are circular, and
    (b) said inner wall of said housing is spiral shaped.

19. A bulk materials pump feeder according to claim 18 wherein said materials scraper also has a plurality of scraping tips, with the distance between said scraping tips and said hub increasing in the direction of rotation of said drive rotor from the distance between said inner wall of said housing and the circumferential edges of said drive discs at said outlet of said housing to the distance between said inner wall of said housing and the circumferential edges of said drive discs at said inlet of said housing.

20. A bulk materials pump feeder according to claim 18 wherein said materials scraper also has a continuous scraping surface, with the distance between said continous scraping surface and said hub increasing in the direction of rotation of said drive rotor from the distance between said inner wall of said housing and the circumferential edges of said drive discs at said outlet of said housing to the distance between said inner wall of said housing and the circumferential edges of said drive discs at said inlet of said housing.

21. A bulk materials pump feeder according to claim 1, wherein the circumferential edges of the drive discs are beveled.

* * * * *

UNITED STATES PATENT AND TRADEMARK OFFICE
CERTIFICATE OF CORRECTION

PATENT NO. : 6,832,887 B2
DATED : December 21, 2004
INVENTOR(S) : Timothy R. Baer et al.

It is certified that error appears in the above-identified patent and that said Letters Patent is hereby corrected as shown below:

Title page
Item [75], Inventors "Mickelton", should read -- Mickleton --.
After ABSTRACT, "21 Claims", should read -- 22 Claims --.

Column 6,
Line 37, "wail" should read -- wall --.

Column 8,
Line 11, please add missing Claim 22 to read as follows:
   22. A bulk materials pump feeder according to claim 16, wherein the circumferential edges of the drive discs are beveled.

Signed and Sealed this

Sixteenth Day of August, 2005

JON W. DUDAS
*Director of the United States Patent and Trademark Office*